(12) United States Patent
Vue

(10) Patent No.: US 9,988,151 B2
(45) Date of Patent: Jun. 5, 2018

(54) DEHUMIDIFICATION SYSTEM FOR USE IN A VEHICLE AND METHOD OF ASSEMBLING THEREOF

(71) Applicant: The Boeing Company, Seal Beach, CA (US)

(72) Inventor: Fue Chue Vue, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 507 days.

(21) Appl. No.: 14/162,998

(22) Filed: Jan. 24, 2014

(65) Prior Publication Data

US 2015/0210398 A1  Jul. 30, 2015

(51) Int. Cl.

| | |
|---|---|
| *F24F 11/00* | (2018.01) |
| *B60H 1/00* | (2006.01) |
| *F28F 3/12* | (2006.01) |
| *F25D 17/06* | (2006.01) |
| *B64D 13/06* | (2006.01) |
| *B23P 15/26* | (2006.01) |

(52) U.S. Cl.
CPC .............. *B64D 13/06* (2013.01); *B23P 15/26* (2013.01); *B64D 2013/0662* (2013.01); *Y02T 50/56* (2013.01); *Y10T 29/4935* (2015.01)

(58) Field of Classification Search
CPC .. B64D 13/06; B64D 2013/0662; Y02T 50/56
USPC ..... 165/41, 103.4, 169; 62/93, 288; 244/121
See application file for complete search history.

(56) References Cited

U.S. PATENT DOCUMENTS

| | | | |
|---|---|---|---|
| 2,447,486 A | 8/1948 | Burke, Jr. | |
| 2,585,570 A | 2/1952 | Messinger et al. | |
| 3,623,332 A | 11/1971 | Fernandes | |
| 3,861,142 A | 1/1975 | Bose | |
| 4,187,090 A | 2/1980 | Bizzarro et al. | |
| 4,312,191 A | 1/1982 | Biagini | |
| 4,326,383 A * | 4/1982 | Reed ...................... | F25B 21/02 62/3.62 |
| 4,430,867 A * | 2/1984 | Warner ................... | B60H 1/32 62/172 |
| 4,517,813 A | 5/1985 | Eggebrecht et al. | |
| 4,681,610 A | 7/1987 | Warner | |

(Continued)

FOREIGN PATENT DOCUMENTS

| | | |
|---|---|---|
| CA | 2552157 A1 | 7/2005 |
| CN | 1902454 A | 1/2007 |

(Continued)

OTHER PUBLICATIONS

EPO Extended European Search Report for related application 15151229.0 dated Jun. 2, 2015; 7 pages.

(Continued)

*Primary Examiner* — Henry Crenshaw
(74) *Attorney, Agent, or Firm* — Coats & Bennet, PLLC

(57) ABSTRACT

A dehumidification system for use in a vehicle is provided. The system includes a thermally conductive member coupled to an outer skin of the vehicle, and a duct at least partially circumscribing the thermally conductive member such that an air flow passage is defined between the duct and the thermally conductive member. The thermally conductive member is configured to transmit a temperature of the outer skin to moisture-laden air channeled through the air flow passage.

18 Claims, 4 Drawing Sheets

(56) References Cited

U.S. PATENT DOCUMENTS

| | | | |
|---|---|---|---|
| 4,819,720 A * | 4/1989 | Howard | B64D 13/00 165/104.34 |
| 4,949,626 A | 8/1990 | Townsend et al. | |
| 5,241,828 A * | 9/1993 | Kapitulnik | H01L 35/16 136/238 |
| 5,948,253 A | 9/1999 | Hearn | |
| 6,143,185 A | 11/2000 | Tracy et al. | |
| 6,331,195 B1 * | 12/2001 | Faust | B01D 45/16 55/396 |
| 6,365,051 B1 * | 4/2002 | Bader | B01D 61/147 210/640 |
| 6,427,458 B1 | 8/2002 | Fowler | |
| 6,442,944 B1 | 9/2002 | Skur, III | |
| 7,005,175 B2 * | 2/2006 | Hachenberg | B64C 1/067 244/119 |
| 7,470,300 B2 | 12/2008 | Faust et al. | |
| 8,967,528 B2 | 3/2015 | Mackin et al. | |
| 8,973,393 B2 | 3/2015 | Atkey et al. | |
| 9,815,564 B2 | 11/2017 | Krug et al. | |
| 2003/0087049 A1 | 5/2003 | Hachenberg et al. | |
| 2008/0087767 A1 | 4/2008 | Scott | |
| 2008/0302910 A1 | 12/2008 | Calamvokis | |
| 2009/0189018 A1 * | 7/2009 | Dittmar | B64C 1/066 244/121 |
| 2010/0044512 A1 | 2/2010 | Carsten | |
| 2012/0096879 A1 * | 4/2012 | Lam | B64D 37/32 62/93 |
| 2012/0186282 A1 | 7/2012 | Army et al. | |
| 2013/0331019 A1 | 12/2013 | Piesker | |
| 2014/0008144 A1 | 1/2014 | Savian et al. | |
| 2015/0021006 A1 | 1/2015 | Vue et al. | |
| 2015/0251764 A1 | 9/2015 | Klimpel et al. | |

FOREIGN PATENT DOCUMENTS

| | | |
|---|---|---|
| CN | 101014806 A | 8/2007 |
| CN | 101410297 A | 4/2009 |
| CN | 102179140 A | 9/2011 |
| CN | 10236914 A | 3/2012 |
| CN | 103422885 A | 12/2013 |
| EP | 0808273 B1 | 9/1998 |
| EP | 2479108 A2 | 7/2012 |
| FR | 2720340 A1 | 12/1995 |
| GB | 2167551 B | 6/1989 |
| JP | 2003191897 A | 7/2003 |
| JP | 2005014745 A | 1/2005 |
| JP | 2006087672 A | 4/2006 |
| JP | 2007519555 A | 7/2007 |
| JP | 2009530164 A | 8/2009 |
| JP | 2011529418 A | 12/2011 |
| WO | 2012063095 A1 | 5/2012 |

OTHER PUBLICATIONS

EP Office Action for related application 141965806 dated Apr. 11, 2016; 5 pp.
Canada Office Action for related application 2,870,240 dated Nov. 27, 2015; 3 pp.
EP Extended European Search Report for related application No. 14196580.6 dated May 6, 2015.
Canada Office Action for related application 2,862,480 dated Oct. 26, 2016; 3 pp.
Bleed air, retrieved on Nov. 27, 2017, https://en.wikipedia.org/wiki/Bleed_air, 5 pages.
Sinnett, Mike, "787 No-Bleed Systems: Saving Fuel and Enhancing Operational Effieciencies", Aero Quarterly,QTR_04/07, 6 Pages, http://www.boeing.com/commercial/aeromagazine/articles/qtr_4_07/article_02_1_html.
JP Office Action for Application No. JP2014-229550, dated Dec. 4, 2017. Translation included.
China Office Action for related application 201410602409.0 dated Sep. 27, 2017; 4 pp.
Office Action from the State Intellectual Property Office of China for related application: CN20150029349 dated Mar. 16, 2018.

* cited by examiner

DEHUMIDIFICATION SYSTEM FOR USE IN A VEHICLE AND METHOD OF ASSEMBLING THEREOF

BACKGROUND

The field of the present disclosure relates generally to dehumidification systems and, more specifically, to a dehumidification system for use in a vehicle that may operate in varying environmental conditions.

At least some known pressurized aircraft use Environmental Control Systems ("ECS") to maintain cabin pressurization and to control cabin temperatures during flight. Due to high occupant density in an aircraft cabin, an ECS generally channels external air from the engines towards the aircraft cabin to pressurize the cabin. This air supply is known as 'bleed air'. Some known systems condition the bleed air using air conditioning packs before the air is distributed towards the cabin and the flight deck during flight. The conditioned air is generally distributed via an air distribution system formed from assemblies that include components such as ducts, valves, and fans.

The moisture content of the conditioned air is at least partially dependent on ambient conditions surrounding the aircraft. As conditioned air is distributed through the air distribution system, moisture can be present due to a variety of environmental factors. For example, in hot and humid environments, moisture may flow past the air conditioning packs, through the air distribution system, and form water droplets on interior surfaces of the air distribution ducts. Moreover, moisture can be caused by passenger respiration and/or perspiration, and condense to form water droplets on cold exposed structures of the aircraft. During flight, an outer skin of the aircraft can reach sub-zero temperatures which may cause the accumulated water droplets to freeze on the cold exposed structures. As the aircraft enters warmer climates, the frozen water droplets melt and may enter the cabin and/or drip on passengers via interior lining breaks defined in ceilings and panels of the aircraft cabin.

BRIEF DESCRIPTION

In one aspect of the disclosure, a dehumidification system for use in a vehicle is provided. The system includes a thermally conductive member coupled to an outer skin of the vehicle, and a duct at least partially circumscribing the thermally conductive member such that an air flow passage is defined between the duct and the thermally conductive member. The thermally conductive member is configured to transmit a temperature of the outer skin to moisture-laden air channeled through the air flow passage.

In another aspect of the disclosure, an aircraft assembly is provided. The aircraft assembly includes a fuselage including an outer skin, and a dehumidification system. The dehumidification system includes a thermally conductive member coupled to an outer skin of the vehicle, and a duct at least partially circumscribing the thermally conductive member such that an air flow passage is defined between the duct and the thermally conductive member. The thermally conductive member is configured to transmit a temperature of the outer skin to moisture-laden air channeled through the air flow passage.

In yet another aspect of the disclosure, a method of assembling a dehumidification system for use in an aircraft assembly is provided. The method includes coupling a thermally conductive member to an outer skin of the aircraft assembly, and at least partially circumscribing the thermally conductive member with a duct such that an air flow passage is defined between the duct and the thermally conductive member. The thermally conductive member is configured to transmit a temperature of the outer skin to moisture-laden air channeled through the air flow passage.

DETAILED DESCRIPTION

The implementations described herein relate to a dehumidification system for use in a vehicle operating in varying environmental conditions. In the exemplary implementation, the dehumidification system includes a thermally conductive member coupled to an outer skin of the vehicle, and a duct at least partially circumscribing the thermally conductive member. As the vehicle operates in comparatively cold environments, a temperature of the thermally conductive member decreases to facilitate condensing and collecting moisture from moisture-laden air in the vehicle on a surface thereof. In some implementations, the outer skin reaches temperatures below the freezing point of water causing the moisture to condense and freeze on the surface of the thermally conductive member. As the vehicle operates in comparatively warm environments, the temperature of the thermally conductive member increases to facilitate melting the moisture therefrom. The duct then collects and facilitates channeling the melted moisture away from moisture sensitive components in the vehicle and reducing the risk of moisture from entering into the cabin and onto passengers seated therein.

Figure 1:
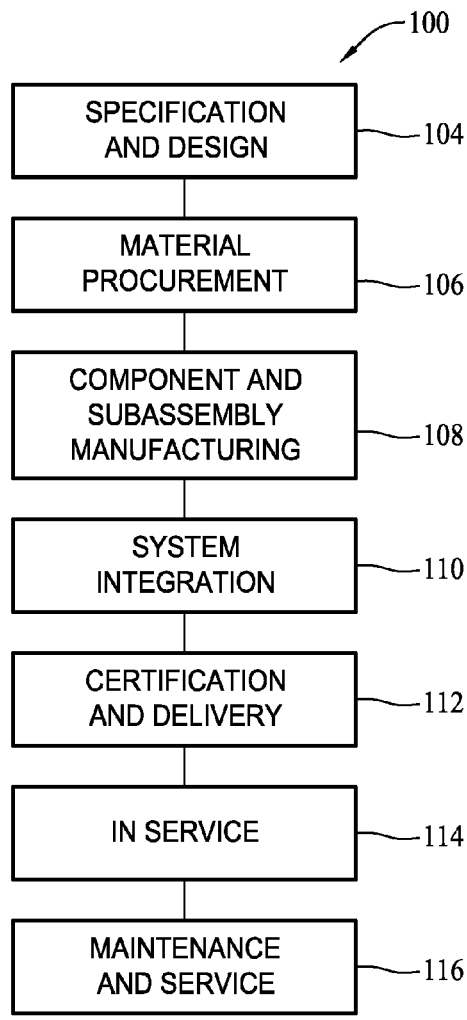
FIG. 1 is a flow diagram of an exemplary aircraft production and service methodology.
Figure 2:
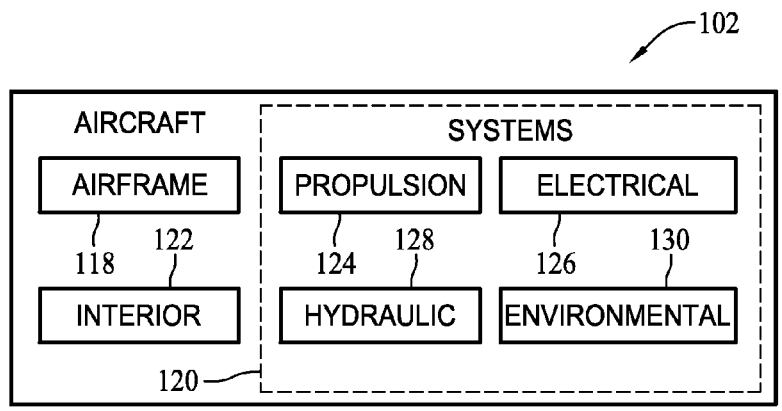
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
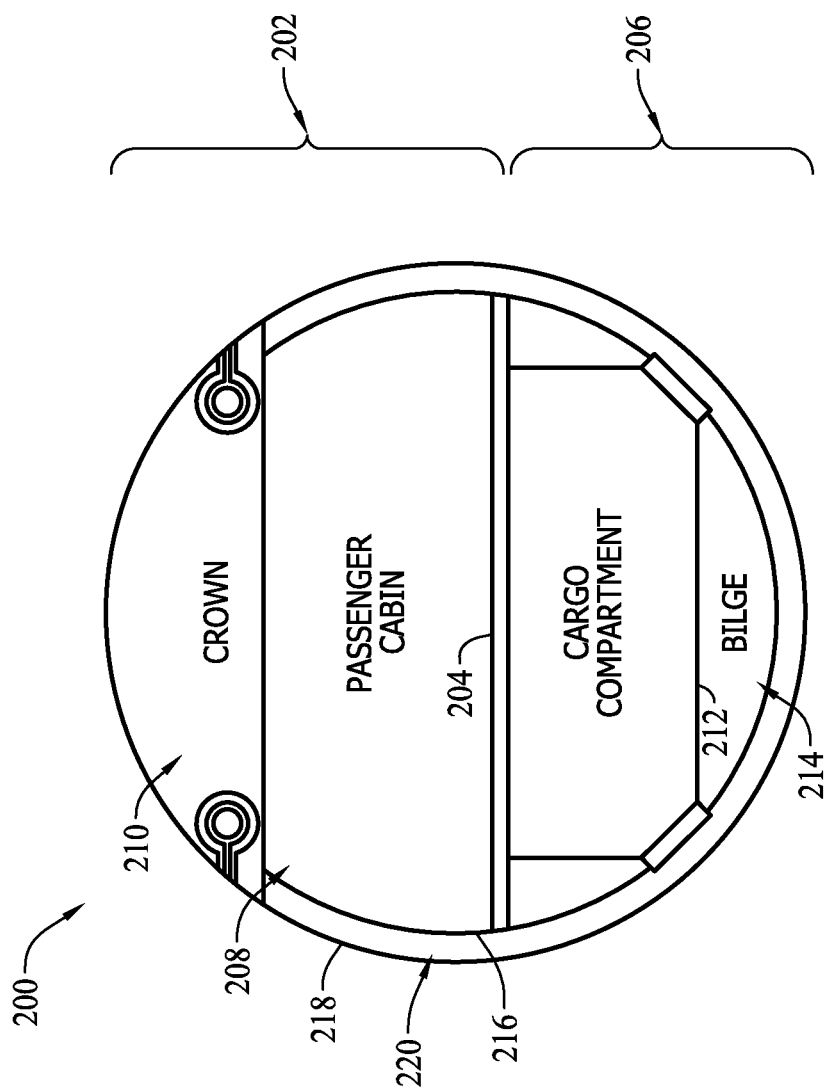
FIG. 3 is a cross-sectional illustration of an exemplary aircraft fuselage.

FIG. 3 is a cross-sectional illustration of an exemplary aircraft fuselage 200 that may be used in aircraft 102 (shown in FIG. 2). In the exemplary implementation, aircraft fuselage 200 includes an upper lobe 202 located above a floor beam 204, and a lower lobe 206 located below floor beam 204. Upper lobe 202 includes a passenger cabin 208 and a crown 210, and lower lobe 206 includes a cargo compartment 212 and a bilge 214. Aircraft fuselage 200 also includes a passenger cabin side wall 216, an outer skin 218 that defines an external boundary (not shown) of aircraft fuselage 200, and a side wall volume 220 defined therebetween. In the exemplary implementation, outer skin 218 is exposed to varying environmental conditions during operation of aircraft 102.

Figure 4:
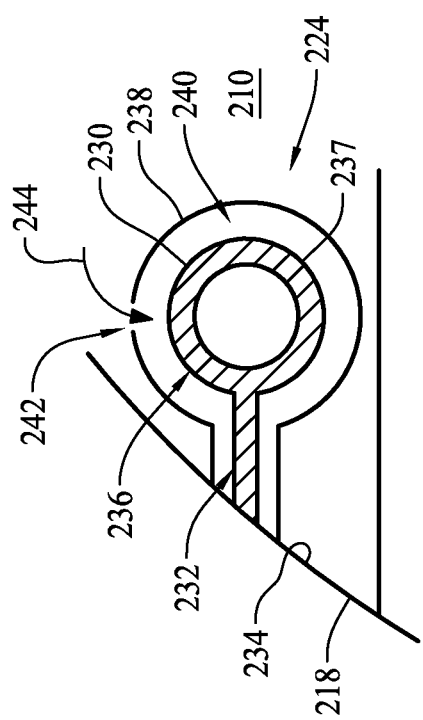
FIG. 4 is an enlarged cross-sectional illustration the aircraft fuselage shown in FIG. 3 taken along Area 4.
Figure 5:
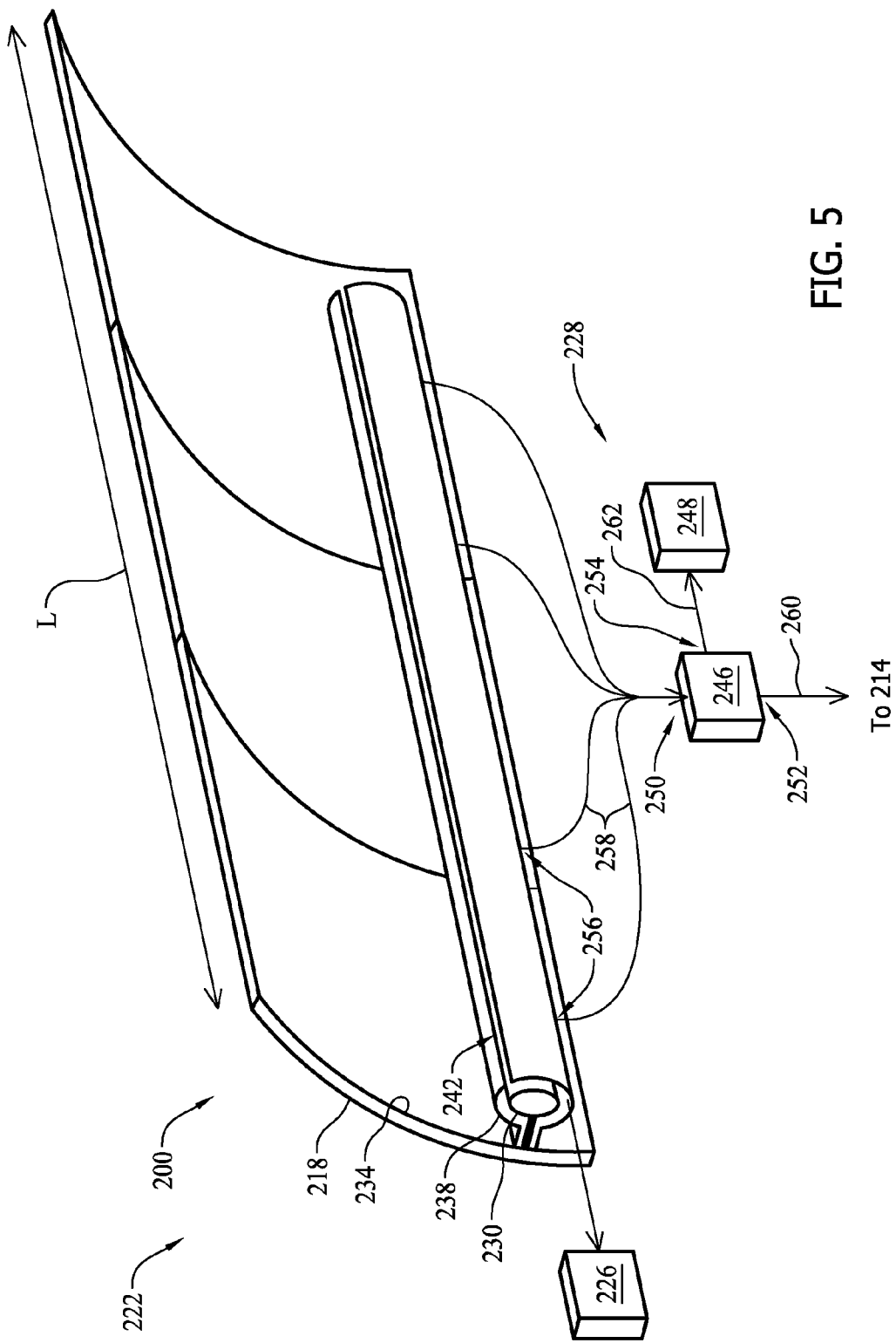
FIG. 5 is a perspective sectional view of the aircraft fuselage shown in FIG. 3.

FIG. 4 is an enlarged cross-sectional illustration of aircraft fuselage 200 taken along Area 4, and FIG. 5 is a perspective sectional view of aircraft fuselage 200. In the exemplary implementation, aircraft fuselage 200 includes a dehumidification system 222 positioned therein. More specifically, dehumidification system 222 includes a duct assembly 224 located in crown 210 of aircraft fuselage 200, and vacuum system 226 and a suction system 228 coupled in flow communication with duct assembly 224.

In the exemplary implementation, duct assembly 224 includes a thermally conductive member 230 coupled to outer skin 218 and extending at least partially along a length L of aircraft fuselage 200. More specifically, thermally conductive member 230 includes a first portion 232 coupled to an inner surface 234 of outer skin 218, and a second portion 236 extending at least partially into crown 210. Second portion 236 has any cross-sectional shape that enables dehumidification system 222 to function as described herein. For example, second portion 236 has a cross-sectional shape that facilitates increasing a surface area of an outer surface 237 of thermally conductive member 230. Increasing the surface area of outer surface 237 has the potential to increase an amount of condensed moisture that can be collected thereon. In the exemplary implementation, second portion 236 has a substantially cylindrical cross-sectional shape.

Thermally conductive member 230 may be fabricated from any material that enables dehumidification system 222 to function as described herein. In the exemplary implementation, the material is lightweight to facilitate reducing an impact of thermally conductive member 230 on the fuel efficiency of aircraft 102, and has a thermal conductivity that enables a temperature of thermally conductive member 230 to substantially align with a temperature of outer skin 218. As such, the temperature of thermally conductive member 230 will increase or decrease as aircraft 102 operates in comparatively warm or cold environments. An exemplary material used to fabricate thermally conductive member 230 includes, but is not limited to, aluminum.

Dehumidification system 222 also includes a duct 238 coupled to outer skin 218 and extending at least partially along length L of aircraft fuselage 200. Alternatively, duct 238 may be coupled directly to first portion 232 of thermally conductive member 230. Duct 238 at least partially circumscribes thermally conductive member 230 such that an air flow passage 240 is defined therebetween. Duct 238 also includes an air inlet opening 242 that couples air flow passage 240 in flow communication with crown 210. Air inlet opening 242 may have any shape that enables dehumidification system 222 to function as described herein. In the exemplary implementation, air inlet opening 242 is a substantially continuous slit (not shown) extending along length L of aircraft fuselage 200. Duct 238 is oriented such that air inlet opening 242 is coupled in flow communication with crown 210.

Duct 238 may be fabricated from any material that enables dehumidification system 222 to function as described herein. In the exemplary implementation, the material used to fabricate duct 238 has a lower thermal conductivity than the material used to fabricate thermally conductive member 230. As such, more condensed moisture will collect on thermally conductive member 230 than on duct 238.

As described above, vacuum system 226 is coupled in flow communication with duct assembly 224. More specifically, vacuum system 226 facilitates creating a negative pressure in duct 238 to draw moisture-laden air 244 from crown 210, through air inlet opening 242, and into air flow passage 240. Vacuum system 226 may be any system capable of moving fluid, such as air, between such locations. An exemplary vacuum system 226 includes, but is not limited to, a fan assembly.

As described above, suction system 228 is coupled in flow communication with duct assembly 224. More specifically, suction system 228 facilitates creating a negative pressure in duct 238 to drain fluid therefrom. Suction system includes a sump 246 coupled in flow communication with duct 238, and a ventilation system 248 coupled in flow communication with sump 246. Sump 246 includes an inlet 250, a first outlet 252, and a second outlet 254 defined therein. Inlet 250 is coupled in flow communication with a plurality of drainage outlets 256 defined in duct 238 via a plurality of first drainage lines 258. Moreover, first outlet 252 is coupled in flow communication with bilge 214 via a second drainage line 260, and second outlet 254 is coupled in flow communication with ventilation system 248 via a suction line 262. Bilge 214 receives fluid and/or waste therein and is periodically emptied at predetermined intervals. Moreover, although dehumidification system 222 is shown as including a single sump 246, dehumidification system 222 may implement any number of sumps to facilitate receiving fluid from duct 238.

In the exemplary implementation, ventilation system 248 facilitates creating a pressure in sump 246 that is lower than a pressure in duct 238 to draw fluid from duct 238 towards sump 246 and/or bilge 214. An exemplary ventilation system 248 includes, but is not limited to a lavatory and galley ventilation system (LGVS) for moving waste air from lavatories, wash basins, galleys, compartments, and/or chiller monuments in aircraft 102. Ventilation system 248 facilitates maintaining a relatively constant negative pressure within suction line 262 to enable waste air to be moved therethrough regardless of orientation. Alternatively, the negative pressure within sump 246 may be created using an existing fan assembly (not shown) within aircraft 102. Moreover, alternatively, suction line 262 may be directly coupled to first drainage lines 258 to facilitate drawing fluid in duct 238 towards sump 246 and/or bilge 214.

In some implementations, the negative pressure created by suction system 228 is in the range between about 5 inches of water column (in. H$_2$O) and about 8 in. H$_2$O. Alternatively, the negative pressure within suction system 228 can be any pressure that facilitates movement of waste air as described herein. As such, suction system 228 substantially eliminates the necessity of orienting first drainage lines 258 in a gravity feed orientation to enable liquid and/or moisture to flow towards sump 246.

In operation, moisture-laden air 244 is drawn into crown 210 (shown in FIG. 3) of aircraft fuselage 200 to enable dehumidification system 222 to remove moisture from moisture-laden air 244. More specifically, upper recirculation fans (not shown) draw moisture-laden air 244 from passenger cabin 208 (shown in FIG. 3) towards crown 210. Duct assembly 224 of dehumidification system 222 is positioned in crown 210 of aircraft fuselage 200 such that air flow passage 240 of duct 238 is coupled in flow communication with crown 210.

Dehumidification system 222 is selectively operable between a first operational mode and a second operational mode. For example, vacuum system 226 operates to create a negative pressure in duct 238 in the first operational mode, and suction system 228 operates to create a negative pressure in duct 238 in the second operational mode. As such, vacuum system 226 and suction system 228 operate independently from each other based on the environmental conditions surrounding aircraft 102. In the exemplary implementation, dehumidification system 222 operates in the first operational mode when aircraft 102 is operating in comparatively cold environmental conditions. For example, dehumidification system 222 operates in the first operational mode when aircraft 102 is in flight, and when a temperature of outer skin 218 can reach sub-zero temperatures. As the upper recirculation fans draw moisture-laden air 244 into crown 210, vacuum system 226 operates to draw moisture-laden air 244 through air inlet opening 242 and into air flow passage 240.

Thermally conductive member 230 is fabricated from material that is generally responsive to variations in the temperature of outer skin 218 such that thermally conductive member 230 transmits the temperature of outer skin 218 to moisture-laden air 244 channeled through air flow passage 240. More specifically, thermally conductive member 230 facilitates condensing moisture from moisture-laden air 244 as the temperature of outer skin 218 decreases in response to aircraft 102 operating in comparatively cold environments.

As the temperatures of outer skin 218 and thermally conductive member 230 decrease below the freezing point of the condensed moisture, at least a portion of the moisture collects and freezes on outer surface 237 of thermally conductive member 230. As such, substantially moisture-free air may then be recirculated for use in passenger cabin 208, for example.

In the exemplary implementation, dehumidification system 222 operates in the second operational mode when aircraft 102 operates in comparatively warm environments. For example, dehumidification system 222 operates in the second operational mode when aircraft 102 is not in service, and when the temperature of outer skin 218 increases above the freezing point of the moisture. More specifically, thermally conductive member 230 facilitates melting frozen moisture from outer surface 237 as the temperature of outer skin 218 increases in response to aircraft 102 operating in the comparatively warm environment. As such, fluid removed from outer surface 237 is collected in duct 238 and drained therefrom using suction system 228. Alternatively, the fluid is removed from duct 238 via gravity draining.

A method of assembling dehumidification system 222 for use in aircraft assembly 102 is also included herein. The method includes coupling thermally conductive member 230 to outer skin 218 of aircraft assembly 102, and at least partially circumscribing thermally conductive member 230 with duct 238 such that air flow passage 240 is defined between duct 238 and thermally conductive member 230. Thermally conductive member 230 is configured to transmit a temperature of outer skin 218 to moisture-laden air 244 channeled through air flow passage 240. More specifically, coupling thermally conductive member 230 includes coupling first portion 232 of thermally conductive member 230 to inner surface 234 of outer skin 218, and extending second portion 236 of thermally conductive member 230 at least partially into crown 210 of aircraft assembly 102.

The method also includes extending at least one of thermally conductive member 230 and duct 238 along length L of fuselage 200 of aircraft assembly 102, and orienting duct 238 such that at least one air inlet opening 242 defined therein is coupled in flow communication with crown 210 of aircraft assembly 102. Moreover, the method includes coupling vacuum system 226 in flow communication with duct 238, wherein vacuum system 226 is configured create a negative pressure in duct 238 to draw moisture-laden air 244 through the at least one air inlet opening 242, and coupling suction system 228 in flow communication with duct 238, wherein suction system 228 is configured to create a negative pressure in duct 238 to drain fluid from duct 238.

The implementations described herein relate to dehumidification systems for use in a vehicle, such as an aircraft. The dehumidification system includes a thermally conductive member coupled to an outer skin of the aircraft, and a duct at least partially circumscribing the thermally conductive member. As the aircraft operates in comparatively cold and warm environments, the thermally conductive member transmits the temperature of the outer skin to moisture-laden air contacting the thermally conductive member. When the aircraft is operating in a comparatively cold environment, the thermally conductive member facilitates condensing moisture from the moisture-laden air. As such, the systems described herein facilitate dehumidifying air circulating through the aircraft in a simple and cost-effective manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dehumidification system for use in a vehicle, said system comprising:
   a thermally conductive member coupled to an outer skin of the vehicle and extending into an interior of the vehicle; and
   a duct at least partially circumscribing said thermally conductive member to define an air flow passage between said duct and said thermally conductive member, said duct comprising an elongated length with opposing and spaced-apart first and second ends, said duct comprising an air inlet opening that extends along the length and is configured to channel moisture-laden air from a passenger cabin in the vehicle and into said duct, said thermally conductive member configured to transmit a temperature of the outer skin to the moisture-laden air channeled through said air flow passage, and said thermally conductive member having a thermal conductivity that enables a temperature of said thermally conductive member to substantially align with the temperature of the outer skin, said duct further comprising drainage outlets spaced apart along the length of the duct;
   the air inlet opening positioned along an upper section of the duct and the drainage outlets positioned along a lower section of the duct to drain moisture that has collected in the duct.

2. The system in accordance with claim 1, wherein said thermally conductive member is configured to condense the moisture from the moisture-laden air.

3. The system in accordance with claim 2, wherein said thermally conductive member comprises an outer surface configured to collect at least a portion of the moisture condensed from the moisture-laden air.

4. The system in accordance with claim 2, wherein said duct has a lower thermal conductivity than the thermally conductive member so more of the moisture collects on the thermally conductive member than on the duct.

5. The system in accordance with claim 1 further comprising a vacuum system coupled in flow communication with said duct and configured to create a negative pressure in said duct to draw the moisture-laden air through the air inlet opening defined in said duct and along the length of the duct.

6. The system in accordance with claim 1 further comprising a suction system coupled in flow communication with said duct and configured to drain the moisture from said duct through said drainage outlets.

7. The system in accordance with claim 6, wherein said suction system comprises:
   a sump coupled in flow communication with said duct; and
   a ventilation system coupled in flow communication with said sump, wherein said suction system is configured to create a pressure in said sump that is lower than a pressure in said duct.

8. The system in accordance with claim 7, wherein said sump further comprises an outlet coupled in flow communication with a bilge.

9. An aircraft assembly comprising:
   a fuselage comprising an outer skin and a passenger cabin; and
   a dehumidification system comprising:
      a thermally conductive member coupled to said outer skin of said fuselage; and
      a duct at least partially circumscribing said thermally conductive member to define an air flow passage between said duct and said thermally conductive member, and said thermally conductive member configured to condense moisture from moisture-laden air to form substantially moisture-free air, said dehumidification system configured to recirculate the substantially moisture-free air to said passenger cabin, said duct having an air inlet opening that extends along the duct to receive the moisture-laden air;
      a suction system coupled in flow communication with said duct and configured to drain the moisture from said duct at multiple points along the duct;
      said thermally conductive member configured to transmit a temperature of the outer skin to the moisture-laden air channeled through said air flow passage, and said thermally conductive member having a thermal conductivity that enables a temperature of said thermally conductive member to substantially align with a temperature of said outer skin.

10. The assembly in accordance with claim 9, wherein said fuselage further comprises a crown configured to receive the moisture-laden air therein, said duct oriented such that the air inlet opening defined therein is coupled in flow communication with said crown.

11. The assembly in accordance with claim 10, wherein said thermally conductive member comprises an outer surface configured to collect at least a portion of the moisture condensed from the moisture-laden air.

12. The assembly in accordance with claim 10, wherein said thermally conductive member is configured to freeze the condensed moisture collected thereon at a first temperature, and is configured to melt the condensed moisture at a second temperature higher than the first temperature.

13. The assembly in accordance with claim 9 further comprising a vacuum system coupled in flow communication with said duct and configured create a negative pressure in said duct to draw the moisture-laden air through the air inlet defined in said duct.

14. A method of assembling a dehumidification system for use in an aircraft assembly, said method comprising:
   coupling a thermally conductive member to an outer skin of the aircraft assembly; and
   at least partially circumscribing the thermally conductive member with a duct to define an air flow passage between the duct and the thermally conductive member, the duct including a length that extends between opposing first and second ends, wherein the duct includes an air inlet opening configured to channel the moisture-laden air from a passenger cabin in the aircraft assembly and into the duct, wherein the thermally conductive member is configured to transmit a temperature of the outer skin to moisture-laden air channeled through the air flow passage, and the thermally conductive member has a thermal conductivity that enables a temperature of the thermally conductive member to substantially align with a temperature of the outer skin;
   coupling a vacuum system in flow communication with the duct, wherein the vacuum system is configured create a negative pressure in the duct to draw the moisture-laden air through the air inlet opening at points away from the first and second ends of the duct and in a first direction along the length of the duct; and coupling a suction system in flow communication with the duct, wherein the suction system is configured to create a negative pressure in the duct to drain moisture from the duct in a second direction away from the length of the duct.

15. The method in accordance with claim 14 further comprising extending at least one of the thermally conductive member and the duct along a length of a fuselage of the aircraft assembly.

16. The method in accordance with claim 14, wherein coupling a thermally conductive member comprises:
    coupling a first portion of the thermally conductive member to an inner surface of the outer skin; and
    extending a second portion of the thermally conductive member at least partially into a crown of the aircraft assembly.

17. The method in accordance with claim 14 further comprising orienting the duct such that the air inlet opening defined therein is coupled in flow communication with a crown of the aircraft assembly.

18. The assembly in accordance with claim 1, wherein said duct has a lower thermal conductivity than said thermally conductive member so more of the condensed moisture collects on the thermally conductive member than on the duct.

* * * * *